US006223879B1

(12) United States Patent
Schöps

(10) Patent No.: US 6,223,879 B1
(45) Date of Patent: May 1, 2001

(54) MOUNTING ASSEMBLY FOR ESCALATOR ROOF SUPPORT

(75) Inventor: Karl-Friedrich Schöps, Berlin (DE)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/629,558

(22) Filed: Jul. 31, 2000

(51) Int. Cl.[7] .......... B65G 19/02

(52) U.S. Cl. .......... 198/321; 198/326; 198/335

(58) Field of Search .......... 198/321, 326, 198/860.3, 860.4, 860.5, 335, 336

(56) References Cited

U.S. PATENT DOCUMENTS

| | | | | |
|---|---|---|---|---|
| 4,586,599 | * | 5/1986 | Walters | 198/364 |
| 4,819,781 | * | 4/1989 | Saito et al. | 198/335 |
| 5,156,251 | | 10/1992 | Johnson | 198/335 |
| 5,180,047 | | 1/1993 | Barrett et al. | 198/335 |
| 5,207,308 | | 5/1993 | Sheffield et al. | 198/336 |
| 5,284,237 | | 2/1994 | Mello et al. | 198/335 |
| 5,782,333 | | 7/1998 | Pitts | 198/336 |
| 5,947,266 | * | 9/1999 | Rionde | 198/860.3 |
| 6,006,889 | * | 6/1998 | Caron | 198/335 |
| 6,138,815 | * | 5/1999 | Reiners et al. | 198/321 |

* cited by examiner

*Primary Examiner*—Christopher P. Ellis
*Assistant Examiner*—Rashmi Sharma
(74) *Attorney, Agent, or Firm*—Carlson, Gaskey & Olds

(57) ABSTRACT

An escalator or moving walkway for transporting people along a moving path includes a mounting assembly for attaching a roof structure to enclose the moving path and protect the people from rain an other undesirable environmental factors. The escalator is supported by a truss structure. A main bracket is secured to the truss structure outboard of the moving path and a handrail extends along the length of the moving path. Outer decking is secured to the main bracket for partially enclosing the truss structure. At least one roof bracket is mounted to the outer decking for gripping engagement with the main bracket and a roof support member is secured to the roof bracket for supporting the roof structure to enclose the moving path of the escalator or moving walkway. Preferably the main bracket includes grooves or channels for receiving outwardly extending tabs on the roof bracket to prevent vertical separation between the roof and main brackets.

10 Claims, 2 Drawing Sheets

MOUNTING ASSEMBLY FOR ESCALATOR ROOF SUPPORT

BACKGROUND OF THE INVENTION

This invention relates to a mounting assembly for attaching a roof support structure to an escalator or moving walkway.

Escalators or moving walkways are used to transport passengers along a generally flat path or can be used to move passengers from a lower level to an upper level. Often these escalators or moving walkways are not enclosed within buildings. Thus, passengers are exposed to undesirable external environmental elements such as rain, sun, and wind. Also, the environmental contaminants make the escalator or walkway more susceptible to damage. In order to protect the passengers from these environmental elements and to decrease the likelihood of failure due to environmental factors, it is desirable to at least partially enclose the escalator or moving walkway with a roof.

Currently, it is very difficult and expensive to connect a roof to an escalator or moving walkway. In order to attach a roof structure to current escalators or moving walkways, a separate supporting structure must be designed to provide adequate support for the additional weight. This is expensive and time consuming and requires a complete redesign of the existing escalator truss structure.

It is desirable to provide a mounting assembly for a roof structure that can be easily secured to the existing escalator truss structure. The assignee of the present application has developed such a mounting assembly that is inexpensive, easily installed, and which provides a roof structure that protects passengers and the escalator or moving walkway components from the environmental elements.

SUMMARY OF THE INVENTION

A mounting assembly for securing a roof structure to an escalator or moving sidewalk includes at least one main bracket secured to a truss member that supports the escalator or moving walkway. At least one roof bracket is mounted for engagement with the main bracket and a roof support member is secured to the roof bracket for supporting the roof structure to at least partially enclose the escalator or moving walkway.

In a disclosed embodiment, the main bracket has a pair of channels extending along the length of the bracket and the roof bracket has a body portion with a pair of legs extending outwardly from the body portion. The legs are received in the channels to secure the roof bracket to the main bracket. Preferably, each of the legs includes a transversely extending distal end portion for gripping engagement with the channels to prevent vertical separation between the roof bracket and the main bracket.

A method for enclosing an escalator or moving walkway includes the following steps. Supporting the escalator or moving walkway with a truss structure. Securing at least one main bracket having at least one groove extending along the length of the bracket to the truss structure. Mounting at least one roof bracket having a tab to the main bracket. Interlocking the tab in the groove to prevent vertical separation between the main bracket and the roof bracket. Securing a roof support structure to the roof bracket and partially enclosing the escalator or moving walkway by attaching roofing to the roof support structure.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
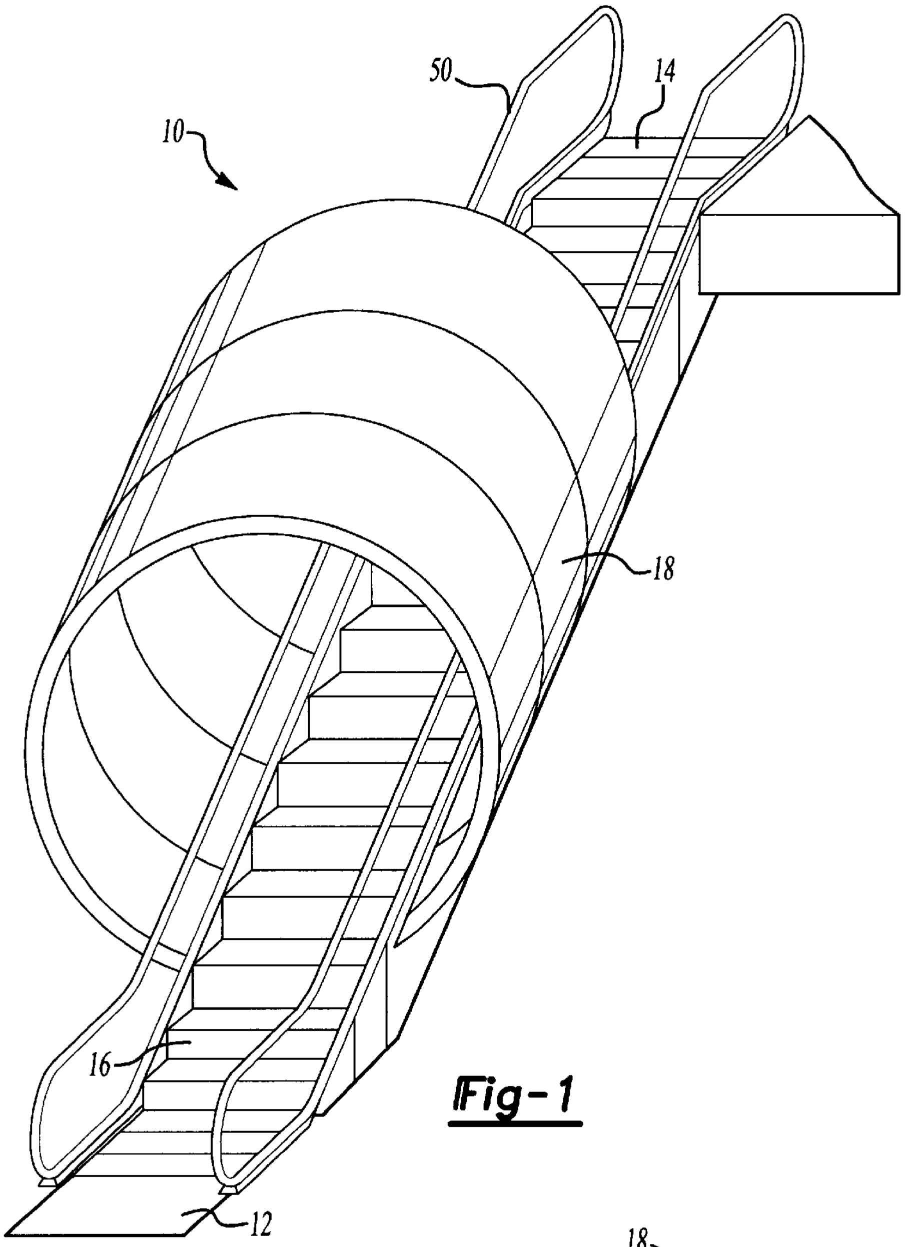
FIG. 1 is a perspective view of an escalator enclosed by a roof structure mounted to the escalator with the subject mounting assembly.

FIG. 1 illustrates an escalator 10 having a bottom landing 12, a top landing 14, and a rise section 16 that interconnects the bottom 12 and top 14 landings. A roof 18 is used to at least partially enclose the escalator such that passengers 20 are protected from external environmental elements such as rain, wind, and sun, for example. The roof 18 is preferably tubular in shape and can extend from the top landing 14 to the bottom landing 12 to entirely enclose the escalator 10 or can extend over only a portion of the escalator, such as the rise section 16, for example.

Figure 2:
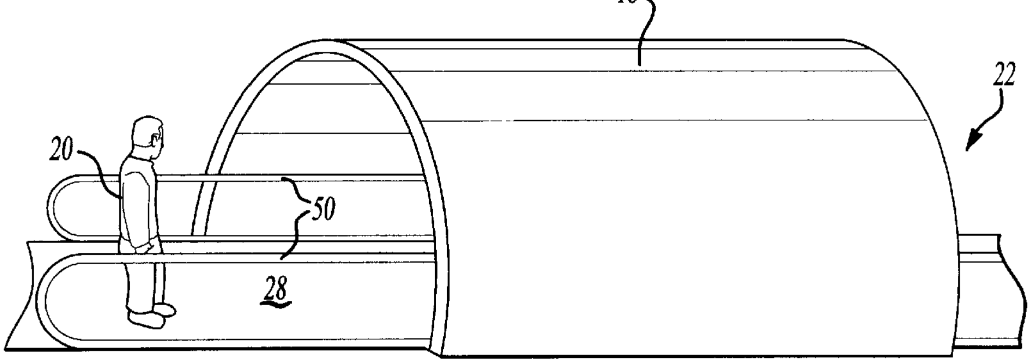
FIG. 2 is a perspective view of a moving walkway enclosed by a roof structure mounted as in FIG. 1.

A similar roof 18 can also be used to enclose a moving walkway 22, shown in FIG. 2. The tubular roof 18 protects the passengers 20 from rain as well as keeping water off of the walkway 22, thus preventing passengers 20 from slipping. While a tubular roof shape is preferred, it should be understood that other roofs could also be used.

Figure 3:
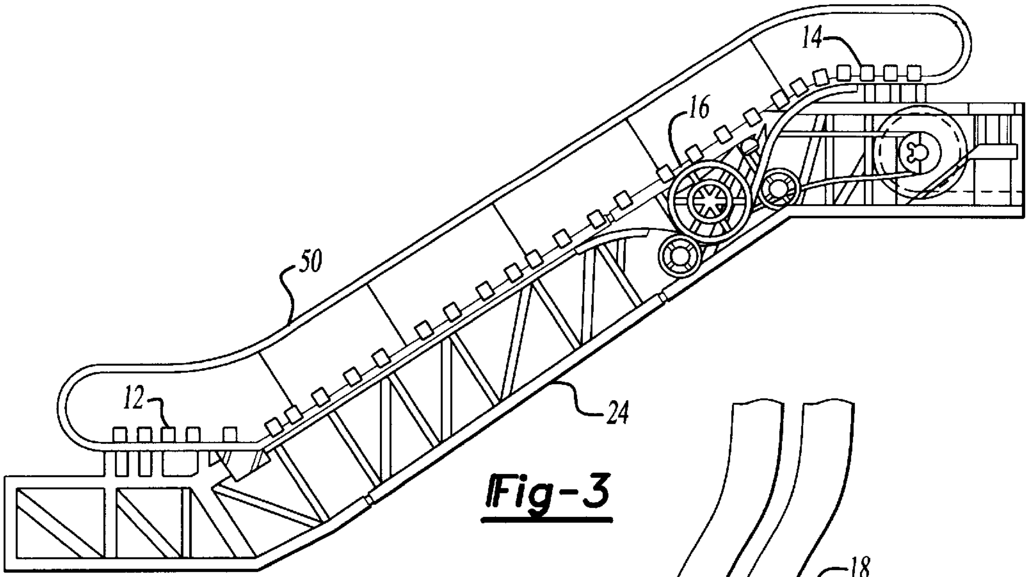
FIG. 3 is a side view of the escalator of FIG. 1 supported on a truss structure.

A mounting assembly is used to secure the roof 18 to the escalator 10 or moving walkway 22. This mounting assembly can be attached to the existing truss structure 24, shown in FIG. 3, which supports the escalator 10 or moving walkway 22. The components and design of the truss structure 24 are well known in the art. The subject mounting assembly is described below in an escalator 10 environment, however, it should be understood that the mounting assembly would also be similarly used in the moving walkway 22.

Figure 4:
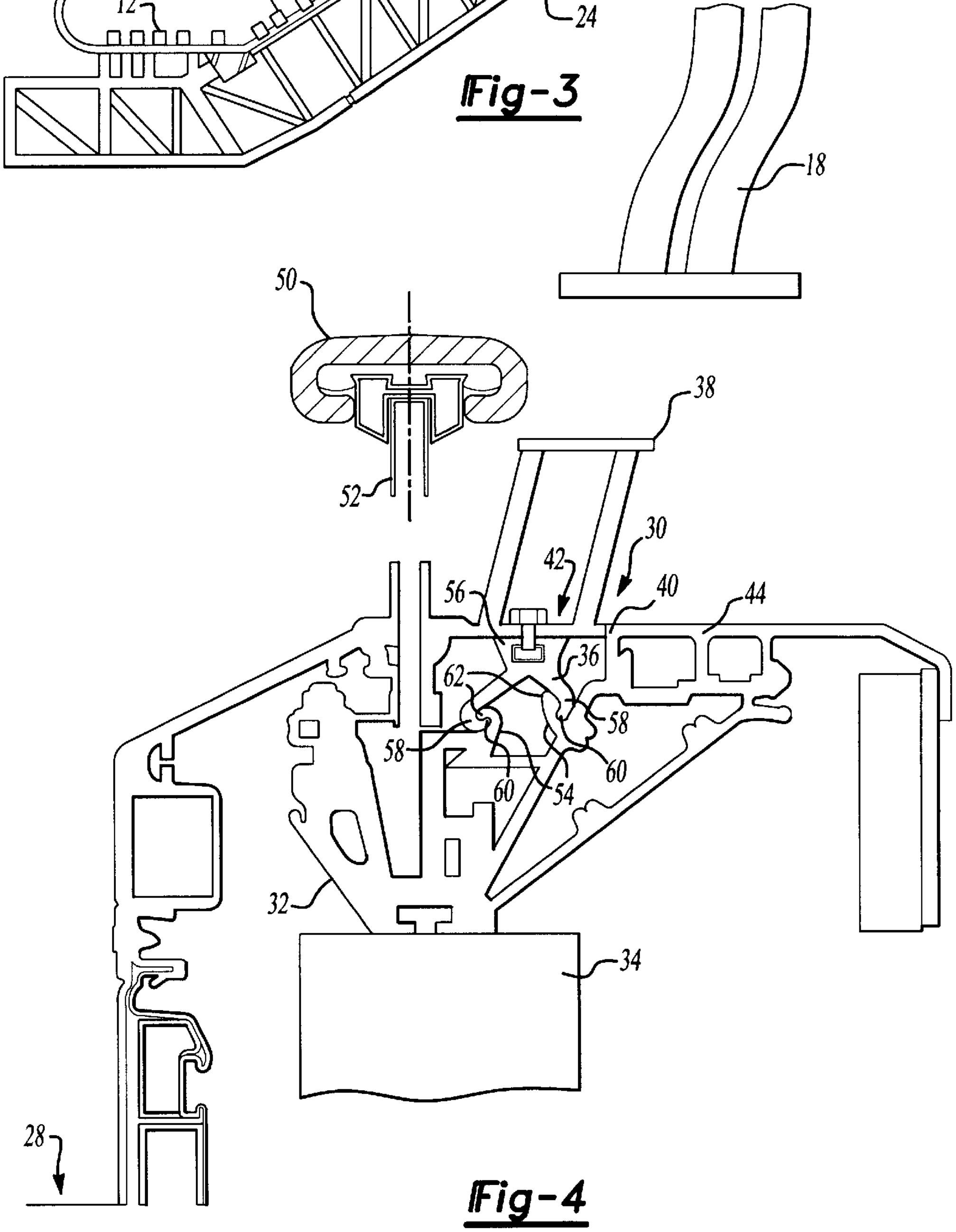
FIG. 4 is a cross-sectional view, partially broken away, of the subject mounting assembly.

The subject mounting assembly is shown generally at 30 in FIG. 4. At least one main bracket 32 is secured to a truss member 34 that is part of the truss structure 24 that supports the escalator 10. The main bracket 32 is secured to the truss structure outboard of the moving path, indicated generally at 28, of the escalator 10. At least one roof bracket 36 is mounted for engagement with the main bracket 32 and a roof support member 38 is secured to the roof bracket 36 for supporting the roof structure 18 that encloses the escalator 10.

The main bracket 32 can either be a single member that extends along the length of the escalator 10 or can be a plurality of brackets that are interspaced along the length of the escalator 10. Outer decking 40 is mounted to the main bracket 32 to partially enclose the truss member 34 and protect other internal escalator components from the external environment.

Preferably, a plurality of main brackets 32 are spaced along the length of the escalator 20. Once the outer decking 40 is attached to the main brackets, openings 42 are cut through a top surface 44 of the decking 40 at each location where a main bracket 32 is secured to a roof bracket 36. The roof brackets 36 are each fastened to the outer decking 40 with fasteners and positioned between the outer decking 40 and the respective main bracket 32. The roof support members 38 extend outwardly from these openings 42. The roof 18 is then attached to the roof support members 38 to provide a completed roof structure.

A handrail 50 extends along the length of the moving path 28 and is supported by the main bracket 32 and the truss structure 24. A balustrade 52 extends downwardly from the handrail 50 and is received in the main bracket 32. The balustrade 52 structure is well known in the art and can be made from various materials such as steel, plastic, or glass, for example. The roof brackets 36 and the roof support members 38 are secured outboard of the handrail 50 and balustrade 52.

In the preferred embodiment, the main bracket 32 has a pair of channels or grooves 54 extending along the length of the bracket 32. The roof bracket 36 has a body portion 56 with a pair of tabs or legs 58 extending outwardly from the body portion 56. The legs 58 are received in the channels 54 in gripping engagement to secure the roof bracket 36 to the main bracket 32. Each of the legs 58 includes a transversely extending distal end portion 60 that grips a lip 62 of the channel 54 to prevent vertical separation between the roof bracket 36 and the main bracket 32.

The method for enclosing the escalator 10 includes the following steps. The escalator 10 is supported by a truss structure 24. At least one main bracket 32 having at least one groove extending along the length of the bracket 32 is secured to the truss structure 24. At least one roof bracket 36 having a tab is secured to the main bracket 32. The tab is interlocked in the groove to prevent vertical separation between the main bracket 32 and the roof bracket 36. Outer decking 40 is secured to the main bracket 32 to enclose the truss structure 24. Openings are cut into the outer decking 40 to expose the roof brackets 36. The roof support members 38 are secured to each of the roof brackets 36 and the escalator 10 is enclosed by attaching a roof 18 to the roof support members 38.

Escalators 10 and moving walkways 22 are used to transport objects, such as passengers 20, baggage, packages, etc. along a moving path. Often the escalators 10 and moving walkways 22 are not enclosed within a building and thus expose passengers and packages to external environmental factors. The subject mounting assembly 30 protects the passengers from rain, sun, and wind by allowing a roof structure to be easily installed onto an exiting truss support structure 24. In addition to protecting the passengers 20 from the environment, the roof 18 prevents passengers from jumping over the handrail 50 and prevents environmental contaminants from the surfaces of the escalators 10 and moving walkways 22, which helps prevent passengers from slipping and protects the components from corrosion.

The foregoing description is exemplary rather than limiting in nature. Many modifications and variations of the present invention are possible in light of the above teachings. The preferred embodiments of this invention have been disclosed, however, one of ordinary skill in the art may recognize that certain modifications are possible that would come within the scope of this invention. It is, therefore, to be understood that within the scope of the appended claims, the invention may be practiced otherwise than as specifically described. For that reason the following claims should be studied to determine the true scope of protection given for this invention.

What is claimed is:

1. A mounting assembly for securing a roof structure to a passenger conveyor comprising:

at least one main bracket secured to a truss member that supports the passenger conveyor;

at least one roof bracket mounted for engagement with said main bracket; and a roof support member secured to said roof bracket for supporting the roof structure to at least partially enclose the passenger conveyor.

2. An assembly as recited in claim 1, wherein said main bracket has a pair of channels extending along the length of said bracket and said roof bracket has a body portion with a pair of legs extending outwardly from said body portion, said legs being received in said channels to secure said roof bracket to said main bracket.

3. An assembly as recited in claim 2, wherein each of said legs includes a transversely extending distal end portion for gripping engagement with said channels to prevent vertical separation between said roof bracket and said main bracket.

4. An assembly as recited in claim 2, wherein said main bracket is a single member that extends along the length of the passenger conveyor.

5. An assembly as recited in claim 2, wherein said at least one main bracket is a plurality of brackets interspaced along the length of the passenger conveyor.

6. An assembly as recited in claim 2, including outer decking mounted to said main bracket to partially enclosing said truss member wherein said roof bracket is fastened to said outer decking and positioned between said outer decking and said main bracket.

7. An escalator or moving walkway for transporting passengers along a moving path comprising:

a supporting truss structure;

at least one main bracket secured to said truss structure outboard of the moving path;

a handrail extending along the length of the moving path and supported by said main bracket and said truss structure;

outer decking secured to said main bracket for partially enclosing said truss structure;

at least one roof bracket mounted to said outer decking for gripping engagement with said main bracket; and a roof support member secured to said roof bracket for supporting a roof structure to at least partially enclose the moving path.

8. An escalator or moving walkway as recited in claim 7, wherein said roof support member is secured outboard of said handrail.

9. An escalator or moving walkway as recited in claim 8, wherein said main bracket has a pair of channels extending along the length of said bracket and said roof bracket has a body portion with a pair of legs extending outwardly from said body portion, said legs being received in said channels to secure said roof bracket to said main bracket.

10. A method for enclosing an escalator or moving walkway comprising the steps of:

supporting the escalator or moving walkway with a truss structure;

securing at least one main bracket having at least one groove extending along the length of the bracket to the truss structure;

mounting at least one roof bracket having a tab to the main bracket;

interlocking the tab in the groove to prevent vertical separation between the main bracket and the roof bracket;

securing a roof support structure to the roof bracket; and partially enclosing the escalator or moving walkway by attaching roofing to the roof support structure.

* * * * *